(12) United States Patent
Tsiopanos et al.

(10) Patent No.: US 9,704,009 B2
(45) Date of Patent: Jul. 11, 2017

(54) MOBILE COMPUTING DEVICE INCLUDING AN ERGONOMIC HANDLE AND THUMB ACCESSIBLE DISPLAY WHILE THE HANDLE IS GRIPPED

(71) Applicant: Symbol Technologies, Inc., Schaumburg, IL (US)

(72) Inventors: Konstantinos D. Tsiopanos, Selden, NY (US); Jaeho Choi, Whitestone, NY (US); Ian R. Jenkins, Stony Brook, NY (US); Richard M. Martin, New Hyde Park, NY (US); Chandra M. Nair, Mount Sinai, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 35 days.

(21) Appl. No.: 13/705,556

(22) Filed: Dec. 5, 2012

(65) Prior Publication Data

US 2014/0014726 A1 Jan. 16, 2014

Related U.S. Application Data

(60) Provisional application No. 61/741,163, filed on Jul. 13, 2012.

(51) Int. Cl.
*G06K 7/10* (2006.01)
*G06K 7/00* (2006.01)
(Continued)

(52) U.S. Cl.
CPC ......... *G06K 7/1091* (2013.01); *G06F 1/1632* (2013.01); *G06K 7/0004* (2013.01); *G06K 7/01* (2013.01); *G06K 7/015* (2013.01); *G06K 7/10* (2013.01); *G06K 7/10009* (2013.01); *G06K 7/10386* (2013.01); *G06K 7/10554* (2013.01); *G06K 7/10881* (2013.01); *G06K 7/14* (2013.01);
(Continued)

(58) Field of Classification Search
CPC .................. G06K 7/10881; G06K 7/1098
USPC .................................... 235/462.47
See application file for complete search history.

(56) References Cited

U.S. PATENT DOCUMENTS

| 4,097,133 A | 6/1978 | Stemme et al. |
| 4,282,425 A | 8/1981 | Chadima et al. |

(Continued)

FOREIGN PATENT DOCUMENTS

| EP | 1225501 A2 | 7/2002 |
| GB | 2299394 A | 10/1996 |

(Continued)

OTHER PUBLICATIONS

Non Final Office Action mailed Aug. 22, 2013 in U.S. Appl. No. 13/685,750, Richard M Martin, filed Nov. 22, 2012.

(Continued)

*Primary Examiner* — Toan Ly (57) ABSTRACT

A mobile device is described. The mobile device includes a handle for gripping the mobile device with fingers of one hand. A display is oriented substantially parallel to a long axis of the handle such that a thumb of the one hand is capable of touching at least a portion of the display when the fingers of the one hand grip the handle of the mobile device. A data acquisition device is positioned so as to capture product information from an object located on an opposite side of the display.

20 Claims, 3 Drawing Sheets

(51) Int. Cl.
*G06K 7/01* (2006.01)
*G06K 7/015* (2006.01)
*G06K 7/14* (2006.01)
*H04M 1/11* (2006.01)
*G06F 1/16* (2006.01)
*G06K 9/22* (2006.01)

(52) U.S. Cl.
CPC ............... *G06K 9/228* (2013.01); *H04M 1/11* (2013.01); *Y10T 29/49117* (2015.01)

(56) References Cited

U.S. PATENT DOCUMENTS

| | | |
|---|---|---|
| 5,035,181 A | 7/1991 | Jacks et al. |
| 5,204,531 A | 4/1993 | Elings et al. |
| 5,250,790 A | 10/1993 | Melitsky et al. |
| 5,340,972 A | 8/1994 | Sandor |
| 5,349,497 A | 9/1994 | Hanson et al. |
| 5,382,784 A | 1/1995 | Eberhardt |
| 5,477,044 A | 12/1995 | Aragon |
| 5,496,992 A | 3/1996 | Madan et al. |
| 5,736,726 A | 4/1998 | VanHorn |
| 5,770,848 A | 6/1998 | Oizumi et al. |
| 5,801,918 A | 9/1998 | Ahearn et al. |
| 5,828,052 A | 10/1998 | Reynolds et al. |
| 5,837,990 A | 11/1998 | Shepard |
| 5,905,248 A | 5/1999 | Russell et al. |
| 5,970,184 A | 10/1999 | Katoh et al. |
| 6,056,199 A | 5/2000 | Wiklof et al. |
| 6,085,981 A | 7/2000 | Knowles et al. |
| 6,115,025 A | 9/2000 | Buxton et al. |
| 6,184,654 B1 | 2/2001 | Bachner et al. |
| 6,223,987 B1 | 5/2001 | Knowles et al. |
| 6,234,395 B1 | 5/2001 | Chadima, Jr. et al. |
| 6,286,760 B1 | 9/2001 | Schmidt et al. |
| 6,394,355 B1* | 5/2002 | Schlieffers et al. ...... 235/472.01 |
| 6,412,699 B1 | 7/2002 | Russell et al. |
| 6,421,234 B1 | 7/2002 | Ricks et al. |
| 6,502,754 B1 | 1/2003 | Bhatia et al. |
| 6,518,952 B1 | 2/2003 | Leiper |
| 6,575,369 B1 | 6/2003 | Knowles et al. |
| 6,607,134 B1 | 8/2003 | Bard et al. |
| 6,648,229 B1 | 11/2003 | Knowles et al. |
| 6,726,070 B2 | 4/2004 | Lautner |
| 6,754,069 B2 | 6/2004 | Harada |
| 6,844,869 B1 | 1/2005 | Kukita |
| 6,853,293 B2 | 2/2005 | Swartz et al. |
| 7,065,299 B2 | 6/2006 | Schulter et al. |
| 7,077,328 B2 | 7/2006 | Krishnaswamy et al. |
| 7,147,162 B2 | 12/2006 | Fitch et al. |
| 7,157,705 B2 | 1/2007 | Hamrelius et al. |
| 7,191,947 B2 | 3/2007 | Kahn et al. |
| D540,838 S | 4/2007 | Aronsson et al. |
| 7,250,603 B1 | 7/2007 | Nugent |
| 7,389,933 B2 | 6/2008 | Wang |
| D583,263 S | 12/2008 | Sebban |
| 7,490,776 B2 | 2/2009 | Thuries |
| 7,562,824 B2 | 7/2009 | Bhatia et al. |
| 7,566,009 B2 | 7/2009 | Lapstun et al. |
| 7,609,406 B2 | 10/2009 | Roth et al. |
| 7,746,511 B2 | 6/2010 | Hamilton et al. |
| 7,748,632 B2 | 7/2010 | Coleman et al. |
| 7,764,488 B2 | 7/2010 | Calvarese |
| 7,867,019 B1 | 1/2011 | Loukusa et al. |
| 7,886,377 B2 | 2/2011 | Hamberg et al. |
| D658,222 S | 4/2012 | Elrod et al. |
| D665,440 S | 8/2012 | Sigward |
| 8,245,930 B2* | 8/2012 | Bellows ............... G06K 7/0004 235/440 |
| 8,255,836 B1 | 8/2012 | Gildfind |
| D668,561 S | 10/2012 | Dunkin et al. |
| 8,314,817 B2 | 11/2012 | Williamson et al. |
| 8,825,516 B2 | 9/2014 | Grant et al. |
| 9,202,095 B2 | 12/2015 | Martin et al. |
| 9,314,472 B2 | 4/2016 | Beus et al. |
| 2002/0099894 A1 | 7/2002 | Kehoe et al. |
| 2002/0104887 A1 | 8/2002 | Schlieffers et al. |
| 2002/0140668 A1 | 10/2002 | Crawford |
| 2002/0165436 A1 | 11/2002 | Schluter et al. |
| 2003/0179178 A1 | 9/2003 | Zargham |
| 2004/0129903 A1 | 7/2004 | Diamantstein et al. |
| 2005/0001036 A1 | 1/2005 | Blake et al. |
| 2005/0117624 A1 | 6/2005 | Hollander et al. |
| 2006/0105722 A1 | 5/2006 | Kumar |
| 2006/0138232 A1 | 6/2006 | Hammerslag et al. |
| 2006/0197753 A1 | 9/2006 | Hotelling |
| 2006/0221363 A1 | 10/2006 | Roth et al. |
| 2006/0229034 A1 | 10/2006 | Gizis et al. |
| 2007/0063048 A1* | 3/2007 | Havens ............... G06K 7/10702 235/462.46 |
| 2007/0067745 A1 | 3/2007 | Choi et al. |
| 2007/0131774 A1 | 6/2007 | Celestini |
| 2008/0078839 A1 | 4/2008 | Barkan |
| 2008/0105747 A1 | 5/2008 | Orlassino |
| 2008/0116093 A1 | 5/2008 | Felten et al. |
| 2008/0116271 A1 | 5/2008 | Holz et al. |
| 2008/0128492 A1 | 6/2008 | Roth et al. |
| 2008/0128499 A1 | 6/2008 | Chen et al. |
| 2008/0128512 A1 | 6/2008 | Schmidt et al. |
| 2008/0144696 A1 | 6/2008 | Bruggeman et al. |
| 2008/0163504 A1 | 7/2008 | Smith et al. |
| 2009/0033633 A1 | 2/2009 | Newman et al. |
| 2009/0039162 A1 | 2/2009 | Yen |
| 2009/0102925 A1 | 4/2009 | Sheard |
| 2009/0108076 A1 | 4/2009 | Barkan et al. |
| 2009/0116018 A1 | 5/2009 | Austin et al. |
| 2009/0172591 A1 | 7/2009 | Pomper |
| 2009/0224039 A1 | 9/2009 | Hause et al. |
| 2009/0257469 A1 | 10/2009 | Yoshizawa |
| 2009/0266899 A1 | 10/2009 | Yoshizawa |
| 2009/0289116 A1* | 11/2009 | Copeland ............. G06K 7/0004 235/440 |
| 2009/0307634 A1 | 12/2009 | Strandell |
| 2010/0026498 A1 | 2/2010 | Bellows et al. |
| 2010/0037184 A1 | 2/2010 | Sie |
| 2010/0046577 A1 | 2/2010 | Sheard |
| 2010/0096461 A1 | 4/2010 | Kotlarsky et al. |
| 2010/0148066 A1 | 6/2010 | Stratmann et al. |
| 2010/0171021 A1 | 7/2010 | Smith |
| 2010/0228517 A1* | 9/2010 | Wike et al. ................... 702/149 |
| 2010/0260388 A1* | 10/2010 | Garrett ................... G06Q 20/22 382/124 |
| 2010/0277506 A1 | 11/2010 | Yao |
| 2011/0075339 A1 | 3/2011 | Lam |
| 2011/0121075 A1* | 5/2011 | Bellows et al. .............. 235/440 |
| 2011/0164056 A1 | 7/2011 | Ording et al. |
| 2011/0180600 A1 | 7/2011 | Wang et al. |
| 2011/0246336 A1 | 10/2011 | Callaghan et al. |
| 2011/0249104 A1 | 10/2011 | Cardillo et al. |
| 2011/0266348 A1* | 11/2011 | Denniston, Jr. ................ 235/454 |
| 2011/0290886 A1 | 12/2011 | Carlson |
| 2011/0290889 A1 | 12/2011 | Tamburrini et al. |
| 2012/0006896 A1* | 1/2012 | Henry et al. ............. 235/462.46 |
| 2012/0148115 A1* | 6/2012 | Birdwell ................ G06K 9/00 382/116 |
| 2012/0314083 A1 | 12/2012 | Ratliff et al. |
| 2014/0014725 A1 | 1/2014 | Martin et al. |
| 2014/0014726 A1 | 1/2014 | Tsiopanos et al. |
| 2014/0014727 A1 | 1/2014 | Choi et al. |
| 2014/0014728 A1 | 1/2014 | Choi et al. |
| 2014/0145925 A1 | 5/2014 | Martin et al. |

FOREIGN PATENT DOCUMENTS

| | | |
|---|---|---|
| GB | 2358336 | 7/2001 |
| GB | 2396728 A | 6/2004 |
| JP | 2002-117370 A | 4/2002 |
| JP | 2004-135324 A | 4/2004 |
| JP | 2006-502471 A | 1/2006 |
| JP | 2009-282761 A | 3/2009 |
| WO | 9314472 A1 | 7/1993 |

(56) References Cited

FOREIGN PATENT DOCUMENTS

| WO | 127735 | 4/2001 |
|---|---|---|
| WO | 2004066615 A1 | 8/2004 |
| WO | 2007061498 A2 | 5/2007 |

OTHER PUBLICATIONS

Leenes R., et al., "PRIME white paper," EU Project Prime, Privacy and Identity Management for Europe, Third and Final Version, May 15, 2008, 22 pages.
The Motorola MC9500-K Specification Sheet, Copyright Aug. 2009.
The Motorola MC9500-K Series Specification Sheet, Copyright Aug. 2010.
Holz et al., "Fiberio: A Touchscreen that Senses Fingerprints" UIST 2013. http://www.christianholz.net/fiberio.html [Retrieved on Jun. 1, 2016].
Kuriakose, "The First Touchscreen to Recognize Fingerprints" Jul. 23, 2013. http://mashable.com/2013/07/23/tabletop-touchscreen/#9A1rW2X2T5qg [Retrieved on Jun. 1, 2016].
Topolsky, "Motorola Atrix 4G Review" Feb. 14, 2011. http://www.engadget.com/motorola/atrix-4g-review/#/ [Retrieved on Jun. 1, 2016].
Final Office Action issued by the USPTO for U.S. Appl. No. 13/685,750 mailed on Jan. 16, 2014.
Non-final Office Action issued by the USPTO for U.S. Appl. No. 13/685,750 mailed on Oct. 26, 2016.

* cited by examiner

MOBILE COMPUTING DEVICE INCLUDING AN ERGONOMIC HANDLE AND THUMB ACCESSIBLE DISPLAY WHILE THE HANDLE IS GRIPPED

CROSS-REFERENCE TO RELATED APPLICATIONS

This application claims priority to U.S. Provisional Patent Application Ser. No. 61/741,163 filed Jul. 13, 2012, entitled, "MOBILE COMPUTING DEVICE INCLUDING AN ERGONOMIC HANDLE," the contents of which are expressly incorporated herein by reference in their entirety.

TECHNICAL FIELD

The present disclosure relates generally to a mobile computing device having a handle configured to provide ergonomic benefit to a user.

BACKGROUND

Mobile devices often include a handle which allows a user to hold, pickup, or manipulate the devices. A conventional mobile device may have a "gun" style handle which can allow a user to naturally aim the conventional device during a data capture session. Generally the handle of the conventional device is located on a back surface of the device that is opposite to the display surface of the device, such that the long axis of the handle is oriented substantially perpendicularly to a plane of the display.

SUMMARY

In one aspect, the invention is embodied in mobile device. The mobile device includes a handle for gripping the mobile device with fingers of one hand. A display is oriented substantially parallel to a long axis of the handle such that a thumb of the one hand is capable of touching at least a portion of the display when the fingers of the one hand grip the handle of the mobile device. A data acquisition device is positioned so as to capture product information from an object located on an opposite side of the display.

In one embodiment, the mobile device also includes a battery positioned in a recess of the handle. The mobile device can also include a switch located on the handle for triggering the data acquisition device. The display can be a touch screen display. The mobile device can also include a rotary control switch for controlling a volume of the mobile device.

The data acquisition device can include a laser scanner, an imager, and/or a radio-frequency identification (RFID) module. In one embodiment, the data acquisition device is a module that can be removably coupled to a housing of the mobile device.

In another aspect, the invention is embodied in a housing of a mobile device. The housing includes a handle configured for gripping the mobile device with fingers of one hand. A top portion of the housing is coupled to the handle for housing a display device and a data acquisition device. The display device is disposed above the handle of the mobile device such that at least a portion of the display device is accessible to a thumb of the one hand to activate a function of the mobile device when the fingers of the one hand grip the handle of the mobile device. The data acquisition device is disposed on an opposite side of the display device so as to capture product information from an object located on an opposite side of the display device.

In one embodiment, the housing includes a switch located on the handle for triggering the data acquisition device. The function can include a software application executing on a processor of the mobile device. The data acquisition device can include a laser scanner, an imager, and/or a radio-frequency identification (RFID) module. The data acquisition device is a module that can be removably coupled to the housing. The display can be a touch screen display. The housing can also include a rotary control switch for controlling a volume of the mobile device.

In yet another aspect, the invention is embodied in a mobile device. The mobile device includes a handle for gripping the mobile device with fingers of one hand. A display is oriented substantially parallel to a long axis of the handle such that a thumb of the one hand is capable of touching at least a portion of the display when the fingers of the one hand grip the handle of the mobile device. The mobile device also includes means for capturing product information from an object located on an opposite side of the display.

In one embodiment, the means for capturing product information includes depressing a trigger on the handle of the mobile device, the trigger activating a data acquisition device of the mobile device. The data acquisition device can include an imager, a laser scanner, and/or a radio-frequency identification (RFID) module.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein indicate components shown in a figure other than the one in discussion. For example, talking about a device 10 while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to the operation of data acquisition devices, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to mobile devices. According to one embodiment, a mobile device includes a handle for gripping the mobile device with fingers of one hand. A display is oriented substantially parallel to a long axis of the handle such that a thumb of the one hand is capable of touching at least a portion of the display when the fingers of the one hand grip the handle of the mobile device. The display can be located above the handle and oriented such that the display is viewable by a user of the mobile device when the handle is held in the hand of the user.

A data acquisition device is positioned so as to capture data, such as product information, from an object located on an opposite side of the display. For example, the product information can be an item number, dimension, serial number, or any information related to the object. The data acquisition device can generate an electrical signal representative of the data acquired from the object. For example, the data acquisition device can capture a barcode symbol printed on the object. In one embodiment, the data acquisition device can capture radio-frequency identification (RFID) information captured from an RFID tag associated with the object.

The mobile device can also include a trigger switch located on the handle for activating the data acquisition device. A processor of the mobile device receives the electrical signal from the data acquisition device.

Figure 1:
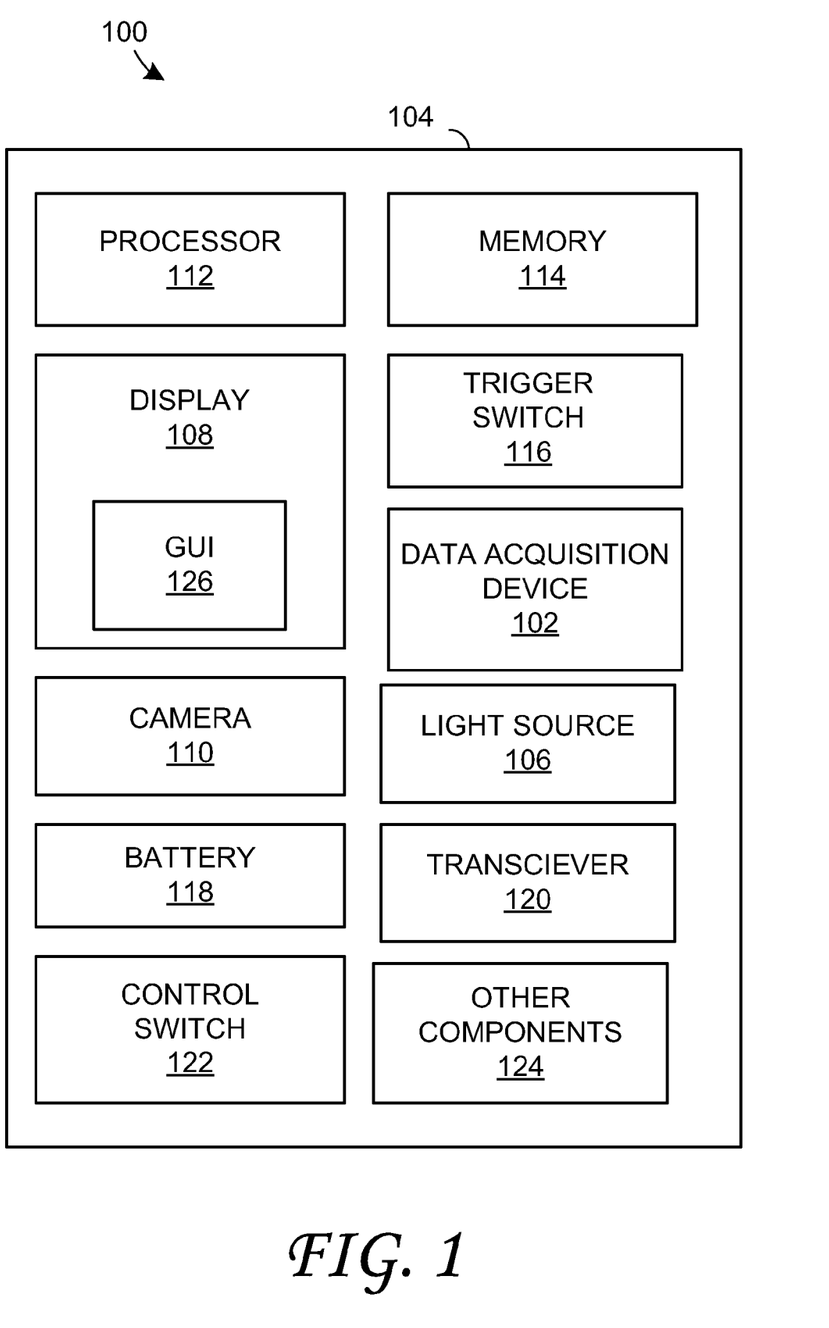
FIG. 1 illustrates a block diagram of the components of a mobile device according to one embodiment of the invention.

FIG. 1 illustrates a block diagram of the components of a mobile device 100 according to one embodiment of the invention. The mobile device 100 includes a data acquisition device 102 supported by a housing 104. The data acquisition device 102 can include an imaging device, a laser scanning device, a radio-frequency identification (RFID) device, or a combination of devices. In practice, any suitable data acquisition device 102 can be used. In one embodiment, an optional light source 106 can be supported by the housing 104. The light source 106 can illuminate a target for data acquisition.

When the data acquisition device 102 includes an imager, the imager can be any component configured to capture image data. For example, the imager can include any type of image sensor or sensors. The imager can capture an image in a field of view (FoV) of the imager. In one embodiment, the image captured in the FoV of the imager can be displayed on a display 108.

In one embodiment, the mobile device 100 can include a camera 110 that captures images located in a field of view (FoV) of the camera 110. In one embodiment, the camera 110 is a component that is separate from the data acquisition device 102. Alternatively, the camera 110 can be integrated with the data acquisition device 102.

The mobile device 100 can also include a processor 112, a memory 114, a trigger switch 116, a battery 118, a transceiver 120, a control switch 122, and other components 124, such as a connector, an antenna, a microphone, a loudspeaker, a volume control, a proximity sensor, a motion sensor, and/or additional switches, for example.

The display 108 can be any component configured to display data to a user. The display 108 can include, for example, a liquid crystal display (LCD) at least partially disposed within the housing 104 of the mobile device 100. The display 108 can include touch screen capability. The display 108 can display a graphical user interface (GUI) 126. The GUI 126 can be programmed to activate different functions of the mobile device 100. For example, the processor 112 can generate the GUI 126 on the display 108 to provide icons corresponding to certain functionality of the mobile device 100.

The trigger switch 116 can activate different functions of the mobile device 100. For example, the trigger switch 116 can activate the data acquisition device 102 of the mobile device 100 in a handheld mode of operation. In one embodiment, the trigger switch 116 can be a momentary switch. Alternatively, the trigger switch 116 can be a "toggle" switch for continuous "on" or "off" operation of the mobile device 100. The trigger switch 116 can be a bifurcated switch (not shown) for controlling two or more functions of the mobile device 100. In one example, the bifurcated switch can have a top switch that activates a first function and a bottom switch that activates a second function of the mobile device 100.

The processor 112 can provide conventional functionalities for the mobile device 100. In a specific example according to the exemplary embodiments of the present invention and as will be described in further detail below, the mobile device 100 can include a plurality of software applications that are executed on the processor 112 such as a software application related to capturing and processing images, documents and video. The memory 114 can also provide conventional functionalities for the mobile device 100. For example, the memory 114 can store data and software applications related to operations performed by the processor 112.

In one embodiment, the mobile device 100 can include a microphone (not shown) that is coupled to the processor 112 and used as an input device to control functions of the mobile device 100. For example, the processor 112 can perform speech recognition on audio data received from the microphone. In one embodiment, the user commands the mobile device 100 to activate the data acquisition device 102 by speaking into the microphone. A loudspeaker (not shown) can provide audio signals to a user. For example, the loudspeaker can emit an audio signal indicating that data was successfully acquired. In one embodiment, the mobile device 100 can include an audio jack (not shown) that couples to an audio connector of a headset. The audio signal can be transmitted to the headset through the audio jack.

The transceiver 120 can provide the mobile device 100 with a method of exchanging data with a communications network and/or other devices. For example, the transceiver 120 can be a Bluetooth transceiver that wirelessly transmits audio signals to a Bluetooth-enabled headset. The transceiver 120 can include a wireless local area network (WLAN) radio for communicating with a WLAN network.

The battery 118 can be a rechargeable battery. The mobile device 100 can include a charging connector (not shown) that is accessible to a corresponding connector on one end of a charging cable. Alternatively, the corresponding connector can be located in a charging cradle (not shown). In practice, the charging connector of the mobile device 100 can be a universal serial bus (USB) connector that conveys data as well as electrical current.

As previously described, the mobile device 100 can include additional components 124 conventionally found in electronic devices, such as a control switches, charging circuitry and one or more antennas, for example.

Figure 2:
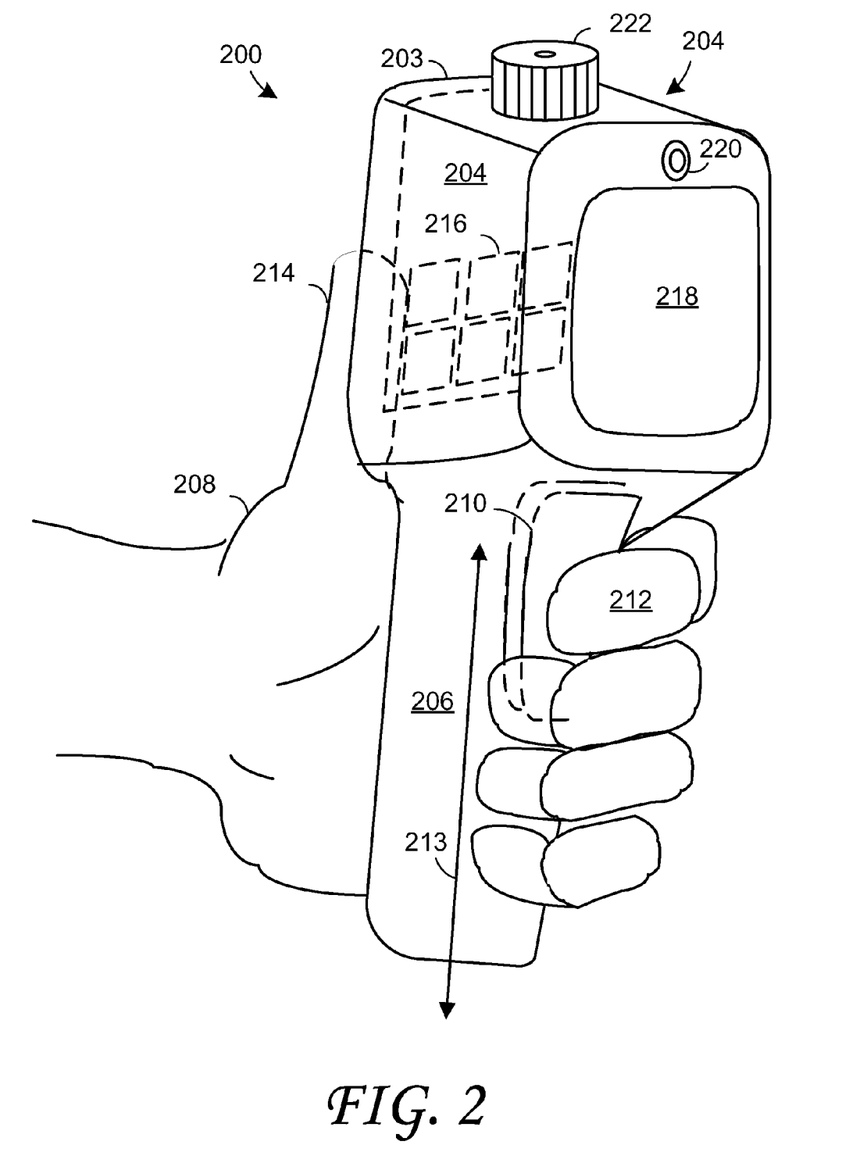
FIG. 2 illustrates a perspective view of a mobile device according to one embodiment of the invention.

FIG. 2 illustrates a perspective view of a mobile device 200 according to one embodiment of the invention. The mobile device 200 includes a housing 202 having a top portion 203 for supporting a display 204. The display 204 can be a touch screen display. The housing 202 includes a handle 206 in the shape of a pistol grip. The handle 206 is configured to be held in a hand 208 of a user. The handle 206 can be supported by a holster (not shown) to enable hands-free operation. The holster can be attached to a belt, a lanyard, a strap, or an article of clothing, such as a vest of a user.

A trigger switch 210 is located on the handle 206 of the mobile device 200. The trigger switch 210 is positioned on the handle 206 such that the trigger switch 210 is accessible to an index finger 212 of the hand 208 of the user when the handle 206 is held in the hand 208 of the user in a hand-held mode of operation.

In one embodiment, the trigger switch 210 can be a momentary switch. Alternatively, the trigger switch 210 can be a "toggle" switch for continuous "on" or "off" operation. In one embodiment, the trigger switch 210 actuates at least one function of the mobile device 200. For example, the trigger switch 210 can activate a data capture function of the mobile device 200.

As previously described, the trigger switch 210 can be a bifurcated switch (not shown) for controlling two or more functions of the mobile device 200. In one example, a bifurcated switch can have a top switch that activates a first function of the mobile device 200 and a bottom switch that activates a second function of the mobile device 200. In practice, the trigger switch 210 can use any suitable switch.

The display 204 can be oriented substantially parallel to a long axis 213 of the handle 206 such that a thumb 214 of the user's hand 208 is capable of touching at least a portion of the display 204 when the fingers of the hand 208 grip the handle 206 of the mobile device 200. By substantially parallel, we mean that a plane of the display 204 can be oriented between zero and approximately twenty degrees relative to a long axis 211 of the handle 206.

In one embodiment, the display 204 can display one or more icons 216 that correspond to various applications or functions executable on the mobile device 200. At least some of the icons 216 displayed on the display 204 are accessible by the thumb 214 of the user's hand 208 when the fingers of the hand 208 grip the handle 206. Additionally, the trigger switch 210 is simultaneously accessible to the index finger 212 of the hand 208 when the user grips the handle 206.

The mobile device 200 also includes a data acquisition device 218 positioned on an opposite side of the display 204 so as to capture product information from an object located in front of a field of view of the data acquisition device 218. The data acquisition device 218 can include an imaging device, a laser scanning device, a radio-frequency identification (RFID) device, or a combination of devices. When the data acquisition device 218 includes an imager, the imager can be any component configured to capture image data. For example, the imager can include any type of image sensor or sensors.

In one embodiment, the mobile device 200 can include a camera 220 that captures images located in a field of view (FoV) of the camera 220. In one embodiment, the camera 220 is a component that is separate from the data acquisition device 218. Alternatively, the camera 220 can be integrated with the data acquisition device 218.

The mobile device 200 can also include a rotary switch 222 for controlling an audio function of the mobile device 200. For example, the rotary switch 222 can control a volume level of a loudspeaker or a gain level of a microphone of the mobile device 200. In one embodiment, the rotary switch 222 controls a volume level of a headset coupled to the mobile device 200 through an audio jack or a Bluetooth connection.

The mobile device 200 can also include a proximity sensor (not shown). The proximity sensor can detect when an object is positioned proximate to the mobile device 200. A processor of the mobile device 200 can activate the data acquisition device 218 in response to the detection of the object by the proximity sensor. The mobile device 200 can also include a motion sensor (not shown). The motion sensor can determine when the mobile device 200 is in a stationary or moving state.

In one embodiment, the mobile device 200 can be fabricated by forming the housing 202 having the handle 206 from a single piece of material. Alternatively, the housing 202 can be formed from several pieces of material, such as a front section and a back section. The display 204 can be coupled to the housing 202 such that it is viewable by a user of the mobile device 200 when the handle 206 is held in the hand 208 of the user.

The data acquisition device 218, such as an imaging device, can be coupled to the housing 202. The imaging device can capture images upon activation of the trigger switch 210. Alternatively, the data acquisition device 218 can be a laser scanning device and/or a radio-frequency identification (RFID) device.

Figure 3:
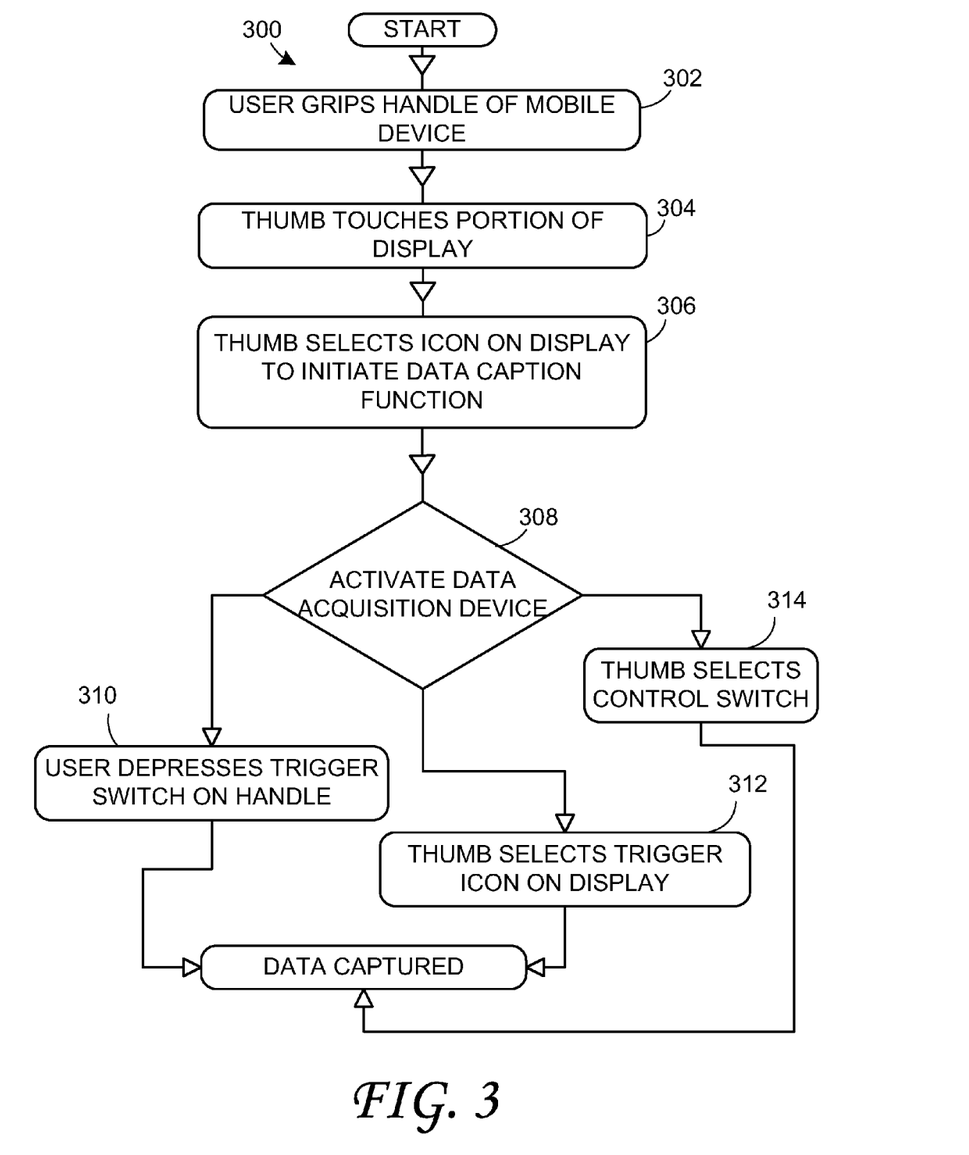
FIG. 3 illustrates a method for operating a mobile device according to one embodiment of the invention.

FIG. 3 illustrates a method 300 for operating the mobile device 200 (FIG. 2) according to one embodiment of the invention. In a first step 302, a user grips the handle 206 of the mobile device 200 with the fingers of a hand 208. The handle 206 can include a trigger switch 210 that is accessible by an index finger 212 of the user's hand 208 when the fingers grip the handle 206. A thumb 214 of the hand 208 touches at least a portion of the display 204 when the user grips the handle 206 (step 304). The display 204 is oriented substantially parallel to and above the handle 206 of the mobile device 200. By substantially parallel, we mean a plane of the display 204 can be oriented between zero and approximately twenty degrees relative to the long axis 211 of the handle 206.

In one embodiment, the user selects an icon 216 on the display 204 with the thumb 214 of the hand gripping the handle 206 (step 306). The icon 216 corresponds to a function of the mobile device 200. For example, the icon 216 can select a data capture function of the mobile device 200. In one embodiment, the data acquisition device 218 is located on an opposite side of the display 204 so as to capture product information from an object.

The data acquisition device 218 can then be activated (step 308). In one embodiment, the data acquisition device 218 is activated by depressing the trigger switch 210 on the handle 206 of the mobile device 200 with one of the fingers of the hand 208, such as the index finger 212 (step 310). Alternatively, the thumb 214 of the hand 208 can select an icon displayed on the display 204 to activate the data acquisition device 218 (step 312). In one embodiment, the thumb 214 can select a control switch (not shown) positioned below the display 204 to activate the data acquisition device 218 (step 314).

In one embodiment, an icon 216 displayed on the display 204 corresponds to a software application executing on a processor 112 (FIG. 1) of the mobile device 200. For example, the software application can include a program for requesting items from a warehouse to be shipped.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:
  a) the word "comprising" does not exclude the presence of other elements or acts than those listed in a given claim;
  b) the word "a" or "an" preceding an element does not exclude the presence of a plurality of such elements;
  c) any reference signs in the claims do not limit their scope;
  d) several "means" may be represented by the same item or hardware or software implemented structure or function;
  e) any of the disclosed elements may be comprised of hardware portions (e.g., including discrete and integrated electronic circuitry), software portions (e.g., computer programming), and any combination thereof;
  f) hardware portions may be comprised of one or both of analog and digital portions;
  g) any of the disclosed devices or portions thereof may be combined together or separated into further portions unless specifically stated otherwise; and
  h) no specific sequence of acts or steps is intended to be required unless specifically indicated.

What is claimed is:

1. A mobile device comprising:
a handle for gripping the mobile device with fingers of one hand;
a display oriented substantially parallel to a long axis of the handle such that a thumb of the one hand is capable of touching at least a portion of the display when the fingers of the one hand grip the handle of the mobile device;
a trigger switch located on the handle such that the trigger switch is accessible by an index finger of the one hand when the thumb of the one hand is touching the portion of the display; and
a data acquisition device positioned so as to capture information from an object located on an opposite side of the display, the data acquisition device being configured to activate to capture the information responsive to:
  (i) a selection, by the thumb of the one hand, of a data capture function presented on the portion of the display; and
  (ii) following the selection, an initiation of the data capture function by one of at least two independent activation modes including:
    (a) a trigger switch activation mode initiated by depressing the trigger switch with one or more fingers of the one hand that grips the handle, and
    (b) a thumb activation mode initiated by selecting a data capture trigger presented on the portion of the display via the thumb of the one hand.

2. The mobile device of claim 1 further comprising a battery positioned in a recess of the handle.

3. The mobile device of claim 1, wherein the at least two independent activation modes further include: a control switch activation mode initiated by depressing a control switch proximate to the display via the thumb of the one hand.

4. The mobile device of claim 1 wherein the data acquisition device comprises an imager.

5. The mobile device of claim 1 wherein the data acquisition device comprises a radio-frequency identification (RFID) module.

6. The mobile device of claim 1 wherein the data capture trigger presented on the portion of the display is a trigger icon.

7. The mobile device of claim 1 wherein the data acquisition device comprises a module that removably couples to a housing of the mobile device.

8. The mobile device of claim 1 wherein the handle is removably coupled to a housing of the mobile device.

9. The mobile device of claim 1 further comprising a rotary control switch for controlling a volume of the mobile device.

10. A housing of a mobile device comprising:
a handle configured for gripping the mobile device with fingers of one hand;
a top portion coupled to the handle for housing a display device and a data acquisition device, the display device disposed above the handle of the mobile device such that at least a portion of the display device is accessible to a thumb of the one hand when the fingers of the one hand grip the handle of the mobile device;
a trigger switch located on the handle such that the trigger switch is accessible by an index finger of the one hand when the thumb of the one hand is touching the portion of the display; and
the data acquisition device disposed on an opposite side of the display device, and configured to capture information from an object located on the opposite side of the display device responsive to:
  (i) a selection, by the thumb of the one hand, of a data capture function presented on the portion of the display; and
  (ii) following the selection, an initiation of the data capture function by one of at least two independent activation modes including:
    (a) a trigger switch activation mode initiated by depressing the trigger switch with one or more fingers of the one hand that grips the handle; and
    (b) a thumb activation mode initiated by selecting a data capture trigger presented on the portion of the display via the thumb of the one hand.

11. The housing of claim 10 wherein the at least two independent activation modes further include: a control switch activation mode initiated by depressing a control switch proximate to the display via the thumb of the one hand.

12. The housing of claim 10; wherein the function comprises a software application executing on a processor of the mobile device.

13. The housing of claim 10, wherein the data acquisition device comprises an imager.

14. The housing of claim 10, wherein the data acquisition device comprises a radio-frequency identification (RFID) module.

15. The housing of claim 10; wherein the data capture trigger presented on the portion of the display is a trigger icon.

16. The housing of claim 10, wherein the data acquisition device comprises a module that removably couples to the housing of the mobile device.

17. The housing of claim 10; further comprising a rotary control switch for controlling a volume of the mobile device.

18. A mobile device comprising:
   a handle for gripping the mobile device with fingers of one hand;
   a display oriented substantially parallel to a long axis of the handle such that a thumb of the one hand is capable of touching at least a portion of the display when the fingers of the one hand grip the handle of the mobile device;
   a trigger switch located on the handle such that the trigger switch is accessible by an index finger of the one hand when the thumb of the one hand is touching the portion of the display; and
   means for capturing information from an object located on an opposite side of the display responsive to:
   (i) a selection, by the thumb of the one hand, of a data capture function presented on the portion of the display; and
   (ii) following the selection, an initiation of the data capture function by one of at least two independent activation modes including:
      (a) a trigger switch activation mode initiated by depressing the trigger switch with one or more fingers of the one hand that grips the handle, and
      (b) a thumb activation mode initiated by selecting a data capture trigger presented on the portion of the display via the thumb of the one hand.

19. The mobile device of claim 18 wherein the data capture trigger presented on the portion of the display is a trigger icon.

20. The mobile device of claim 19 wherein the data acquisition device comprises at least one of an imager, a laser scanner, and a radio-frequency identification (RFID) module.

\* \* \* \* \*